(12) United States Patent
Kim et al.

(10) Patent No.: US 9,378,372 B2
(45) Date of Patent: Jun. 28, 2016

(54) SECURE DOWNLOAD AND SECURITY FUNCTION EXECUTION METHOD AND APPARATUS

(71) Applicant: Samsung Electronics Co., Ltd., Gyeonggi-do (KR)

(72) Inventors: Youngjip Kim, Gyeonggi-do (KR); Peng Ning, Richardson, TX (US); Mooyoung Kim, Seoul (KR); Siejoon Cho, Seoul (KR); Dongho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/331,935

(22) Filed: Jul. 15, 2014

(65) Prior Publication Data

US 2015/0019856 A1 Jan. 15, 2015

(30) Foreign Application Priority Data

Jul. 15, 2013 (KR) ........................ 10-2013-0082615

(51) Int. Cl.
*G06F 9/44* (2006.01)
*G06F 9/00* (2006.01)
*G06F 15/177* (2006.01)
*G06F 21/57* (2013.01)
*G06F 9/445* (2006.01)

(52) U.S. Cl.
CPC ................ *G06F 21/575* (2013.01); *G06F 8/60* (2013.01)

(58) Field of Classification Search
CPC ......... G06F 8/60; G06F 9/4401; G06F 21/57; G06F 21/575

USPC .................................. 717/168–178; 713/1, 2
See application file for complete search history.

(56) References Cited

U.S. PATENT DOCUMENTS

| 6,738,932 | B1 * | 5/2004 | Price ........................... 714/38.11 |
| 7,237,121 | B2 * | 6/2007 | Cammack et al. ............. 713/189 |
| 7,275,153 | B2 * | 9/2007 | Kim ................................. 713/2 |
| 7,398,382 | B2 * | 7/2008 | Rothman et al. ................... 713/2 |
| 8,095,799 | B2 | 1/2012 | Hauck et al. |
| 8,254,568 | B2 | 8/2012 | Smith et al. |
| 8,443,203 | B2 * | 5/2013 | Park et al. ...................... 713/187 |
| 8,914,627 | B2 * | 12/2014 | Park et al. ......................... 713/2 |
| 2003/0056107 | A1 * | 3/2003 | Cammack et al. ............. 713/189 |
| 2004/0064457 | A1 * | 4/2004 | Zimmer et al. ................ 707/100 |
| 2005/0060528 | A1 * | 3/2005 | Kim ................................. 713/1 |
| 2006/0143432 | A1 * | 6/2006 | Rothman et al. ................... 713/2 |
| 2007/0192610 | A1 * | 8/2007 | Chun et al. ...................... 713/176 |
| 2008/0165952 | A1 * | 7/2008 | Smith et al. ...................... 380/28 |
| 2008/0168435 | A1 * | 7/2008 | Tupman et al. ................ 717/173 |
| 2009/0019275 | A1 * | 1/2009 | Park et al. ......................... 713/2 |
| 2010/0023778 | A1 * | 1/2010 | Hauck et al. ................... 713/182 |
| 2011/0167250 | A1 * | 7/2011 | Dicks et al. ....................... 713/2 |
| 2012/0210115 | A1 * | 8/2012 | Park et al. ......................... 713/2 |
| 2014/0173581 | A1 * | 6/2014 | Grinberg et al. .............. 717/170 |

FOREIGN PATENT DOCUMENTS

KR 1020020092222 11/2002

* cited by examiner

*Primary Examiner* — Qing Chen
(74) *Attorney, Agent, or Firm* — The Farrell Law Firm, P.C.

(57) ABSTRACT

A method and electronic device for executing secure download and security function is provided. The method includes storing a unique identifier (ID) of the electronic device, receiving a binary update request, determining whether the stored unique ID matches a unique ID signed to the binary, and downloading the binary depending on whether the unique IDs match.

15 Claims, 6 Drawing Sheets

SECURE DOWNLOAD AND SECURITY FUNCTION EXECUTION METHOD AND APPARATUS

PRIORITY

This application claims priority under 35 U.S.C. §119(a) to a Korean Patent Application filed on Jul. 15, 2013 in the Korean Intellectual Property Office and assigned Serial No. 10-2013-0082615, the entire content of which is incorporated herein by reference.

BACKGROUND

1. Field of the Invention

The present invention relates to a secure download and security function execution method and apparatus and, in particular, to a method and electronic device for executing a secure download and security function in such a way of authenticating signature information of a specific user configured in receiving a binary update request of the electronic device and authenticating specific information of the signed binary in executing a function included in the binary.

2. Description of the Related Art

With the popularity of mobile devices like smartphones and tablet Personal Computers (PCs) and the diversification of application programs, the mobile device usage environment is becoming similar to that of the PC.

In this respect, the damage caused by malicious code has increased dramatically.

Also, as the application fields requiring a high security level, like electronic payment functions, are diversified, the interest and requirement in security of smartphones grows.

Particularly, the open source platform such as Android Operating System (OS) is vulnerable to external attacks and malicious applications distributed through low-security application stores and, recently, many sensitive private information leakage accidents based on illegal acquisition of the trust root information of the platform have been reported.

Since such security vulnerability hampers the widespread use of the smart devices in public fields requiring a high security level, research is being conducted to reinforce the mobile OS security and, as one effective solution, System on Chip (SoC) supports security booting based on a digital certificate and a digital signature in the booting process.

The recent SoC guarantees basic security in the form of a secure boot chain in the booting process.

In order to accomplish this aim, a conventional technology has been disclosed in Korean Patent Laid-open No. 10-2002-0092222 which proposes a secure booting method for protection from booting with an unauthenticated boot image.

SUMMARY

The present invention has been made to address the above problems and disadvantages, and to provide at least the advantages described below. Accordingly, an aspect of the present invention provides a secure download and download function execution method and apparatus that are capable of preventing information leakage in a binary download process of a configured specific user and avoiding malfunctioning probability of the electronic device in executing a function included in a binary.

In accordance with an aspect of the present invention, a method of executing secure download for an electronic device is provided. The method includes storing a unique identifier (ID) of the electronic device, receiving a binary update request, determining whether the stored unique ID matches a unique ID signed to the binary, and downloading the binary depending on whether the unique IDs match.

In accordance with another aspect of the present invention, a method for executing a binary function is provided. The method includes sequentially authenticating and executing at least one boot loader stored in a memory of an electronic device, determining whether information stored in the boot loader matches information of a binary, and executing, when the information matches, the function included in the binary.

In accordance with another aspect of the present invention, a method for executing a function included in a binary of an electronic device is provided. The method includes storing a unique identifier (ID) corresponding to at least one candidate user and information of a boot loader in the electronic device, determining, when a new binary update request is received, whether the unique ID stored in the electronic device matches a unique ID of the binary, downloading and storing, when the unique IDs match, the new binary, sequentially authenticating and executing the at least one boot loader stored in the electronic device, determining whether the information of the boot loader matches information of the stored new binary, and executing a function included in the binary depending on whether the information matches.

In accordance with still another aspect of the present invention, a secure download and function execution apparatus is provided. The secure download and function execution apparatus includes a binary storage unit which stores a binary loaded by execution of a boot loader and executing a function, an authentication configuration unit which stores a unique identifier (ID) corresponding to at least one candidate user and determines, when a binary update request is received, whether a unique ID of a new binary matches a unique ID stored previously to authenticate the new binary, a boot loader specific information storage unit which stores specific information of the boot loader paired with the binary, and a processor which downloads, when the new binary is authenticated successfully, the new binary and executes the function depending on whether the specific information of the boot loader matches the specific information of the new binary.

BRIEF DESCRIPTION OF THE DRAWINGS

The above and other aspects, features and advantages of the present invention will become more readily apparent from the follow detailed description, taken in conjunction with the accompanying drawings, in which.

DETAILED DESCRIPTION OF EMBODIMENTS OF THE PRESENT INVENTION

Embodiments of the present invention are described in detail with reference to the accompanying drawings. Detailed description of well-known functions and structures incorporated herein may be omitted to avoid obscuring the subject matter of the present invention. The same reference numbers are used throughout the drawings to refer to the same or like parts.

In addition, throughout the specification, when it is describe that a part is "connected to" another part, this includes not only a case of "being directly connected to" but also a case of "being indirectly connected to" interposing another device therebetween. Also, when it is described that a component "includes" another component, this does not means the exclusion of other components but means the inclusion of other components unless otherwise stated specifically.

The electronic device according to an embodiment of the present invention can be any type of information communication device and multimedia device including a tablet PC, mobile communication device, mobile phone, Personal Digital Assistant (PDA), smartphone, International Mobile Telecommunication 2000 (IMT-2000) terminal, Code Division Multiple Access (CDMA) terminal, Wideband CDMA (WCDMA) terminal, Global System for Mobile communication (GSM) terminal, General Packet Radio Service (GPRS) terminal, Enhanced Data GSM Environment (EDGE) terminal, Universal Mobile Telecommunication Service (UMTS) terminal, Digital Broadcast terminal, Automated Teller Machine (ATM) terminal, etc.

The electronic device may include at least one of a digital broadcast module for receiving digital broadcast (e.g. Digital Multimedia Broadcasting (DMB) and Digital Video Broadcasting (DVB), a camera module for shooting still and motion images of a subject, a short range communication module for supporting at least one of Bluetooth, Infrared Data Association (IrDA), Radio Frequency Identification (RFID), and Near Field Communication (NFC), a hard key-based input unit, a Radio Frequency (RF) module for supporting voice communication, video conference, and data communication, an Internet access module for supporting Internet Protocol (IP) based communication service, a battery for supplying power to the above components, although they are not depicted and described herein.

While there are some differences, integrated circuit (or chip) manufacturers design chips to operate with the common principle of secure boot chain in the booting process as follows. A boot code is composed of at least two individual codes and the first of them is stored in the ROM memory and is commonly referred to as the ROM memory boot code. This cannot be modified or substituted in any aspect. For example, when the electronic device powers on, the processor executes the boot code stored in the ROM memory and the second boot code subsequently. The second boot code is the original equipment manufacturer (OEM) custom boot code which is written in the ROM memory in order for the manufacturing facility to write in the rewritable memory region, such as flash memory, to control electrons in the manufacturing process.

The ROM boot code is persistently embedded by the chip manufacturer while the OEM boot code can be replaced by the manufacturer in the manufacturing line using a flash write apparatus or engineering downloader. Accordingly, it may incur security vulnerability and may be necessary to check whether the ROM boot code is genuine or modified.

In an embodiment, an electronic signature is generated by signing with the hash value of the execution image (binary or boot image) of the electronic device as the public key and stored in the rewritable flash memory region along with the execution image. The certificate is also stored in the flash memory region, and the hash value is calculated using the public key included in the certificate and the electronic signature for use in checking whether it is altered based on whether the hash values match or not. Here, it is also possible to store only the public key in the flash memory region with the exception of the certificate.

In order to verify the certificate or the public key, the hash value of the certificate is fused at a One Time Programmable (OTP) region such that the fused hash value is compared with the current hash value in the booting process. Since the hash value is at the beginning of the trusted chain (chain of trust), it is referred to as a trust root or root of trust.

Figure 1:
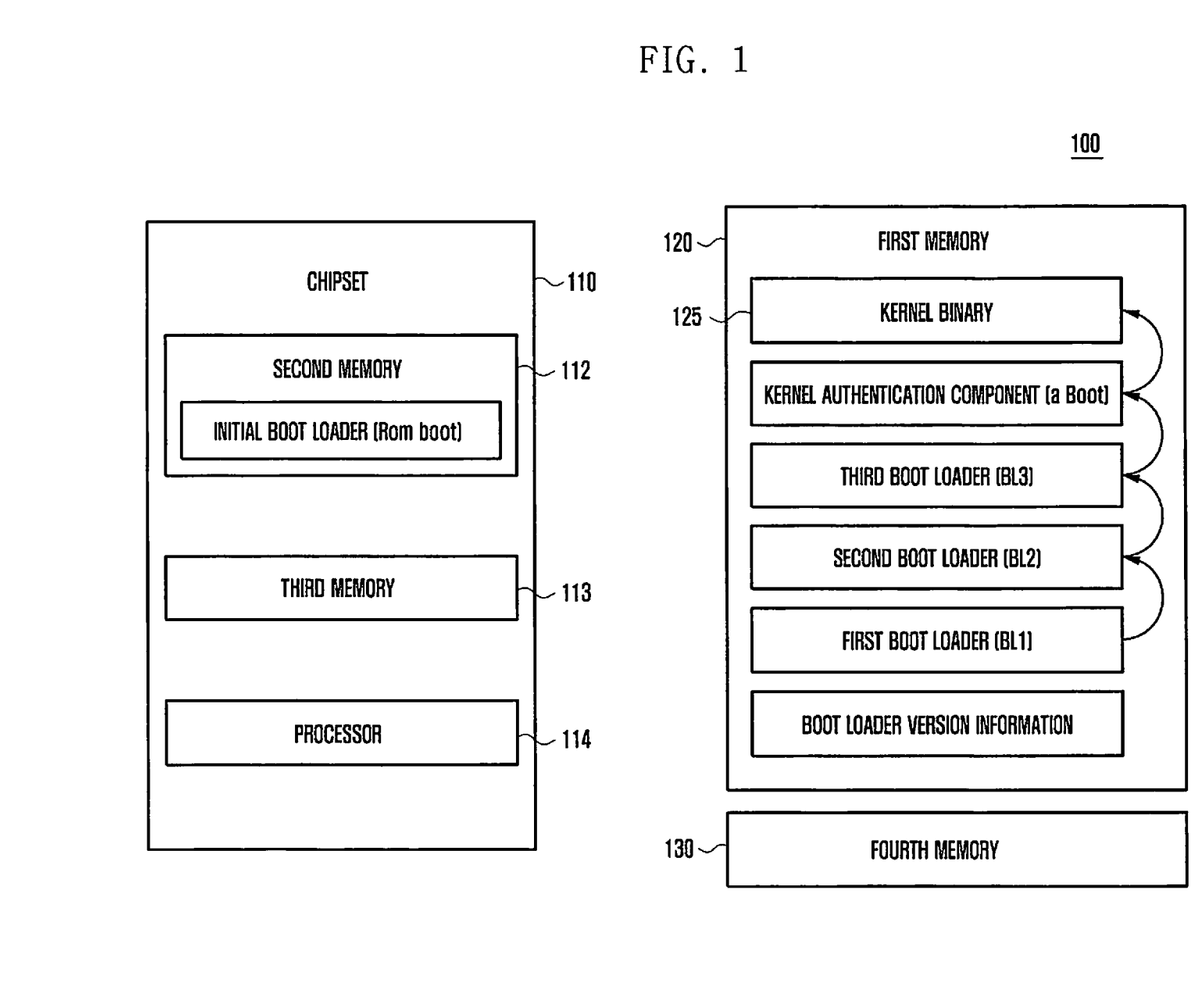
FIG. 1 is a block diagram illustrating a configuration of the electronic device for secure booting according to an embodiment of the present invention.

FIG. 1 is a block diagram illustrating a configuration of the electronic device for secure booting according to an embodiment of the present invention.

Referring to FIG. 1, the electronic device 100 according to an embodiment of the present invention includes a chipset 110, a first memory 120, and a fourth memory 130.

The chipset 110 includes a processor 114, a second memory 112, and a third memory 113. It is obvious that the chipset 110 may further include a memory controller and extra memory.

The first memory 120 includes at least one boot loader, boot loader version information, kernel authentication component, and kernel binary. The boot loader, boot loader version information, kernel authentication component, and kernel binary, which may be software codes.

According to an embodiment of FIG. 1, the first memory 120 includes three boot loaders (i.e. the first boot loader BL1, the second boot loader (BL2), and the third boot loader (BL3)), the boot loader version information, the kernel authentication component (aBoot), and the kernel binary. Although an embodiment is shown in FIG. 1, the present invention is not limited in number of boot loaders. In the case that the first memory 120 stores a plurality of boot loaders, the boot loaders may be authenticated and executed with their signatures sequentially.

The second memory 112 is a volatile memory embodied in the chipset 110 and may store an initial boot loader (ROM BOOT) executed when the electronic device 100 powers on.

The third memory 113 is a volatile memory embodied in the chipset 110 and may provide a space for loading at least some codes of the boot loaders and the kernel binary stored in the first memory 120 dynamically.

The fourth memory 130 is a volatile memory outside the chipset 110 and may provide a space for loading at least some codes of the boot loaders and the kernel stored in the first memory 120 dynamically. For example, the fourth memory 130 may be larger than the third memory 113 in size and, in this case, the code relatively small in size among the boot loaders is loaded on the third memory 113 and the code relatively large in sized on the fourth memory 130, however, the present disclosure is not limited in size of the third and fourth memories 113 and 130. For example, each of the third and fourth memories 113 and 130 may be a volatile memory such as Dynamic Random Access Memory (DRAM), Static Random Access Memory (SRAM), and Synchronous Dynamic Random Access Memory (SDRAM).

For example, if the electronic device 100 powers on, the initial boot loader (ROM BOOT) is loaded on the third memory 113 and executed by the processor 114.

If the initial boot loader (ROM BOOT) is executed, the processor 114 detects the first memory 120, initializes the first memory 120, loads the first boot loader BL1 stored in the first memory 120 onto the third memory 113, authenticates the first boot loader BL1, and executes, if authentication is successful, the first boot loader BL1.

If the first boot loader BL1 is executed, the processor 114 authenticates the second boot loader BL2, and executes, if the authentication is successful, the second boot loader BL2.

If the second boot loader BL2 is executed, the processor 114 detects the fourth memory 130, initializes the fourth memory 130, loads the third boot loader BL3 onto the initialized fourth memory 130, authenticates the third boot loader BL3, and executes, if the authentication is successful, the third boot loader BL3.

With the execution of the third boot loader BL3, the kernel authentication component (aBoot) is executed. The kernel authentication component (aBoot) determines whether the version information stored in at least one of the boot loaders BL1 to BL3 matches the version information of the signed kernel binary stored in the electronic device 100 and boots the electronic device 100 only when the version information matches. Detailed description thereon is made later with reference to FIG. 5.

Although the embodiment of the drawing is directed to a case where the security booting of the electronic device 100 may be performed in the order of the first boot loader (BL1), the second boot loader (BL2), the third boot loader (BL3), the kernel authentication component (aBoot), and the kernel binary, the present invention is not limited to such an execution order or a number of boot loaders or types of the boot loaders. Although a plurality of boot loaders may be stored in the first memory 120, a single boot loader is also possible.

Here, the kernel binary is the core of the operation system of the electronic device 110 and provides various basic services to all other components of the operating system. For example, the operating system provides at least one of process management, memory management, task management, input/output management, and system management services.

The kernel binary executed as the actual booting process of the electronic device after the basic security is guaranteed through the secure booting process as described above. Unlike the secure boot loader, the kernel binary is updated easily using a flashing tool and, since the action of downloading the custom kernel is not illegal basically, it is impossible to block selectively the download of the custom kernel for security of Business-to-Customer/Business-to-Business (B2C/B2B) electronic device. Accordingly, the electronic device operating in B2C/B2B may undergo an unintended situation due to the problem of updating a general kernel binary or downloading a kernel binary for other B2B service.

In order to solve this problem, an embodiment of the present invention provides a method for updating the kernel binary appropriate for the purpose of the user device so as to prevent the electronic device operating in B2B mode from information leakage.

Here, the kernel binary is one of various types of binaries which is selected for explanation convenience, but the present invention can be embodied with other binaries responsible for other functions.

Figure 2:
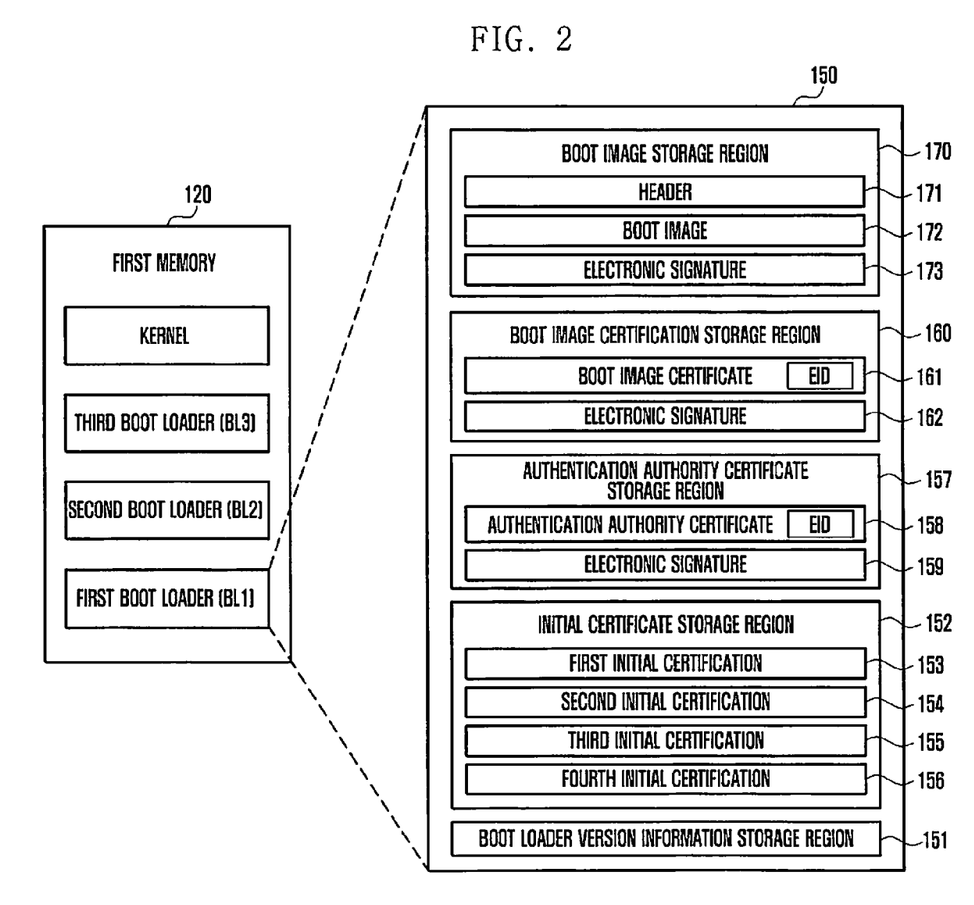
FIG. 2 is a schematic diagram illustrating a configuration of a boot loader for security booting of the electronic device according to an embodiment of the present invention.

FIG. 2 is a schematic diagram illustrating a configuration of a boot loader for security booting of the electronic device according to an embodiment of the present invention. The boot loader of the present disclosure may correspond to at least one of the first boot loader BL1, the second boot loader BL2, and the third boot loader BL3 depicted in FIG. 3.

As shown in FIG. 2, the boot loader according to an embodiment of the present invention includes a boot loader version information storage region 151, an initial certification storage region 152, an authentication authority certification storage region 157, a boot image certification storage region 160, and a boot image storage region 170.

The boot loader version information storage region 151 stores the version information of the boot loaders and, if the boot loader version information is stored in the first memory 120 as shown in FIG. 1, the boot loader version information storage region 151 may be omitted in the boot loader. The boot loader version information is the version information assigned along with the kernel binary paired with the boot loader.

The initial certification storage region 152 may store at least one initial certificate for use in security booting.

For example, if a plurality of initial certifications including the first initial certification 153 and the second initial certification 154 are stored in the initial certification storage region 152, it is possible to change the initial certification to be used in authentication of the boot loader from the first initial certification 153 and the second initial certification 154 especially after the electronic device 100 being sold.

Although the present embodiment is directed to the exemplary case where the first to fourth initial certifications 153 to 156 are stored in the initial certification storage region 152, the present disclosure is not limited in number of initial certifications or storage type. The initial certifications stored in the initial certification storage region 152 may include respective public keys.

Also, the initial certification storage region 152 may store a dummy certification instead of the initial certifications at a certain part thereof. The dummy certification may be the data padded perfunctorily in a reserved unit region for storing the initial certification in the initial certification storage region 152 without meaningful information for use in authentication such as public key.

The first to fourth initial certifications 153 to 156 may be the certifications corresponding to at least one of candidate user (e.g. B2B or B2G client) and manufacturer.

For example, the initial certification storage region 152 may store the authentication information including the public keys corresponding to different candidate B2B clients or a plurality of initial certifications having a plurality of public keys corresponding to the same candidate B2B clients.

According to an embodiment of the present invention, the first initial certification 153 may include the public key of the electronic device manufacturer, and the second initial certification 154 may include the public key of the user (purchaser). The first initial certification 153 may include the first public key of the electronic device manufacturer, and the second initial certification 154 may include the second public key of the same electronic device manufacturer as the first initial certification 153.

The boot image corresponding to the first initial certification 153 and the boot image corresponding to the second initial certification 154 may be identical with or different from each other. When loading the kernel and booting the system, it may be processed differently for authenticating the kernel.

Such an initial certification may be changed after the electronic device 100 is sold.

The boot image certification storage region 160 may store the boot image certificate (attestation certificate) 161.

The boot image certificate 161 is the certificate for verifying the integrity of the boot image 172 and may include auxiliary information about the boot image 172 in the individual fields constituting the boot image certificate 161. The boot image certification storage region 160 may further store the electronic signature 162 which is signed to the boot image certificate 161 with a private key corresponding to the public key of the initial certification. Depending on the implementation, the boot image certificate 161 may include a filed (e.g. EID) associated with the information capable of identifying the user.

The authentication authority certificate storage region 157 may store the authentication authority certificate (attestation CA certificate) 158.

The authentication authority certificate 158 is the certificate for verifying that the boot image certificate is issued by the qualified certification authority and may include supplementary information related to the authentication authority. The authentication authority certificate storage region 157 may further store the electronic signature 159 which is signed to the authentication authority certificate 158 with the private key corresponding to the initial certification. Depending on the implementation, the authentication authority certificate 158 may include a field (e.g. EID) related to the information capable of identifying the user.

The boot image storage region 170 may include a header 171 for a boot image 172, a boot image 172, and the electronic signature 173 of the boot image 172.

The boot image 172 may include source code configured to initialize at least one device included in the electronic device 100 or connected to the electronic device 100 from outside the electronic device 100, source code configured to load the next boot loader or kernel on the internal or external volatile memory, and code configured to authenticate the next boot loader or kernel loaded. The electronic signature 173 of the boot image may be generated by signing the original or abstracted version (e.g. hash value) of the boot image 172 with the private key corresponding to the public key of the initial certification. Here, the private key may be owned by the user (purchaser) or the manufacturer.

Figure 3:
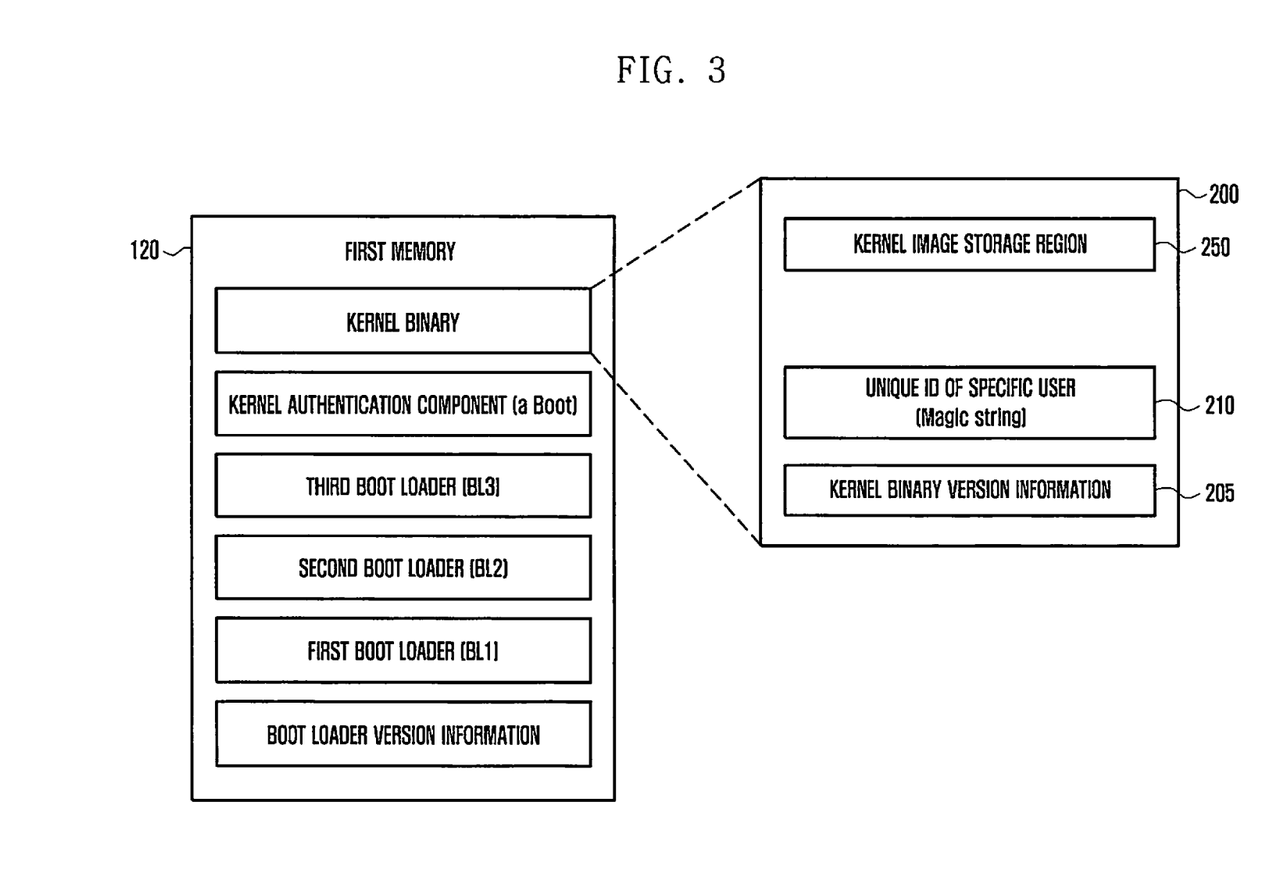
FIG. 3 is a schematic block diagram illustrating a configuration of the kernel binary for secure booting of the electronic device according to an embodiment of the present invention.

FIG. 3 is a schematic block diagram illustrating a configuration of the kernel binary 200 for secure booting of the electronic device 100 according to an embodiment of the present invention.

As shown in FIG. 3, the kernel binary 200 according to an embodiment of the present invention includes kernel binary version information 205, unique ID of specific user (Magic string) 210, and kernel image storage region 250.

The kernel image storage region 250 may store the kernel image to be executed. The kernel image may include source code configured for booting the electronic device 100.

Figure 4:
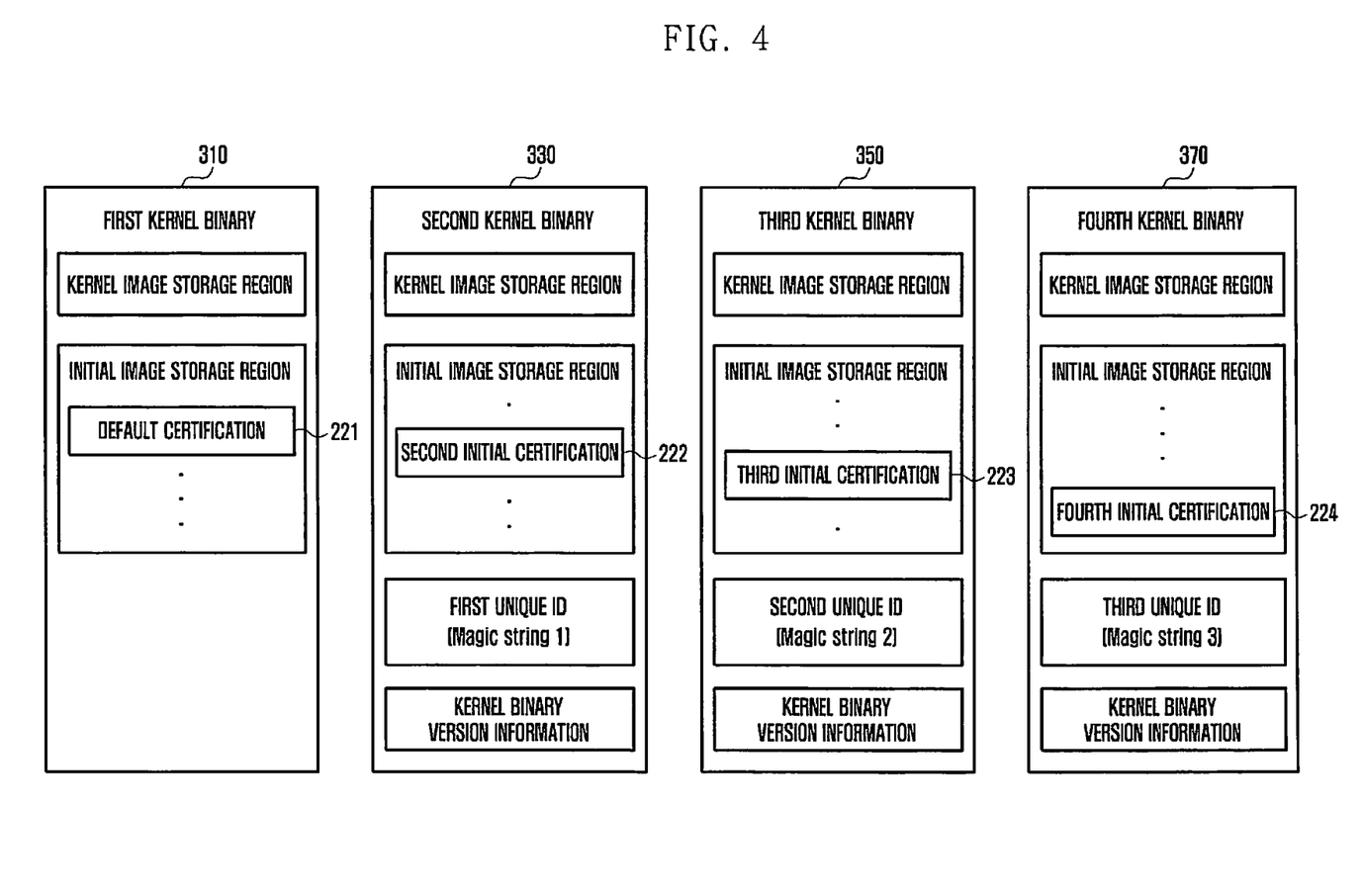
FIG. 4 is a diagram illustrating configurations of various kernel binaries with different initial certifications for used in the secure booting according to an embodiment of the present invention.

FIG. 4 is a diagram illustrating configurations of various kernel binaries with different initial certifications used in the secure booting according to an embodiment of the present invention. Referring to FIG. 4, the kernel binary according to an embodiment of the present invention may include the first kernel binary 310 corresponding to the default certification in the secure booting, the second kernel binary 330 corresponding to the second initial certification in the secure booting, the third kernel binary 350 corresponding to the third initial certification in the secure booting, and the fourth kernel binary 370 corresponding to the fourth initial certification in the secure booting.

That is, the electronic device 100 may store the kernel binary corresponding to an initial certification activated in the secure booting process among the first to fourth kernel binaries 310 to 370.

If the initial certification is configured for securely booting a manufacturing state of the electronic device 100 as default certification, the first kernel binary 310 corresponding to the default certification may be stored as the default of the manufacturing state of the electronic device 110. The second to fourth kernel binaries 330 to 370 may be stored in an external storage device or downloaded from an external source of the electronic device 100 through a connection interface. The connection interface may be a USB connection interface, Ethernet connection interface, or a cellular network connection interface.

For example, after the first kernel binary 310 is stored as default, a request for changing the initial certification from the default certification to one of the second to fourth initial certifications may be received. If the request is received, it is possible to download the kernel binary corresponding to the target initial certification as a new kernel binary from an external source of the electronic device through the connection interface.

With the exception of the default certification, each of the second kernel binary 330, the third kernel binary 350, and the fourth kernel binary 370 may include a first unique ID (magic string 1), a second unique ID (magic string 2), and a third unique ID (magic string 3). The first to third unique IDs (magic string 1 to magic string 3) may be stored in the electronic device in advance of authentication downloading of the kernel binary.

For example, the first unique ID (magic string 1) may be unique for kernel binary download of specific business user (B2B). That is, the first unique ID (magic string 1) makes it possible to distinguish between the kernel binary of the normal user (B2C) and another business user having no corresponding unique ID and the kernel binary of a specific business user (B2B). The second unique ID (magic string 2) may be unique for kernel binary download of the electronic device 100 of the normal user (B2C) and the third unique ID (magic string 3) may be unique for kernel binary download of another business user (B2B), but only the first unique ID (magic string 1) corresponding to a specific business user (B2B) may be configured while omitting the second and third unique IDs (magic strings 2 and 3) according to the designer's intention.

In an exemplary case where the root of trust of the electronic device 100 manufactured to operate in the B2C mode already changes to the B2B mode, a request for changing the initial certification from the default certification 221 to the second initial certification 222 after the first kernel binary 310 of which default certification 221 is activated in the booting process. At this time, the kernel authentication component (aBoot) determines whether unique ID of the kernel binary intended to be downloaded before the download of the second kennel binary 330 as the new kernel binary with the first unique ID preloaded on the electronic device as the authentication process.

If the first unique ID preloaded on the electronic device 100 matches the unique ID of the kernel binary to be downloaded, the electronic device 100 may download the second kernel binary 330.

Otherwise, if the unique ID of the new kernel binary before the download of the new kernel binary mismatches the unique ID preloaded on the electronic device 100, the download of the new kernel binary may be blocked. In this way, it is possible to block the download of the B2C binary or other business user's B2B kernel binary having different B2B unique ID.

As described above, the secure download and security function execution method of the present invention is capable of authenticating the signature information of a specific registered user in updating the kernel binary of the electronic device 100, resulting in avoidance of information leakage.

Figure 5:
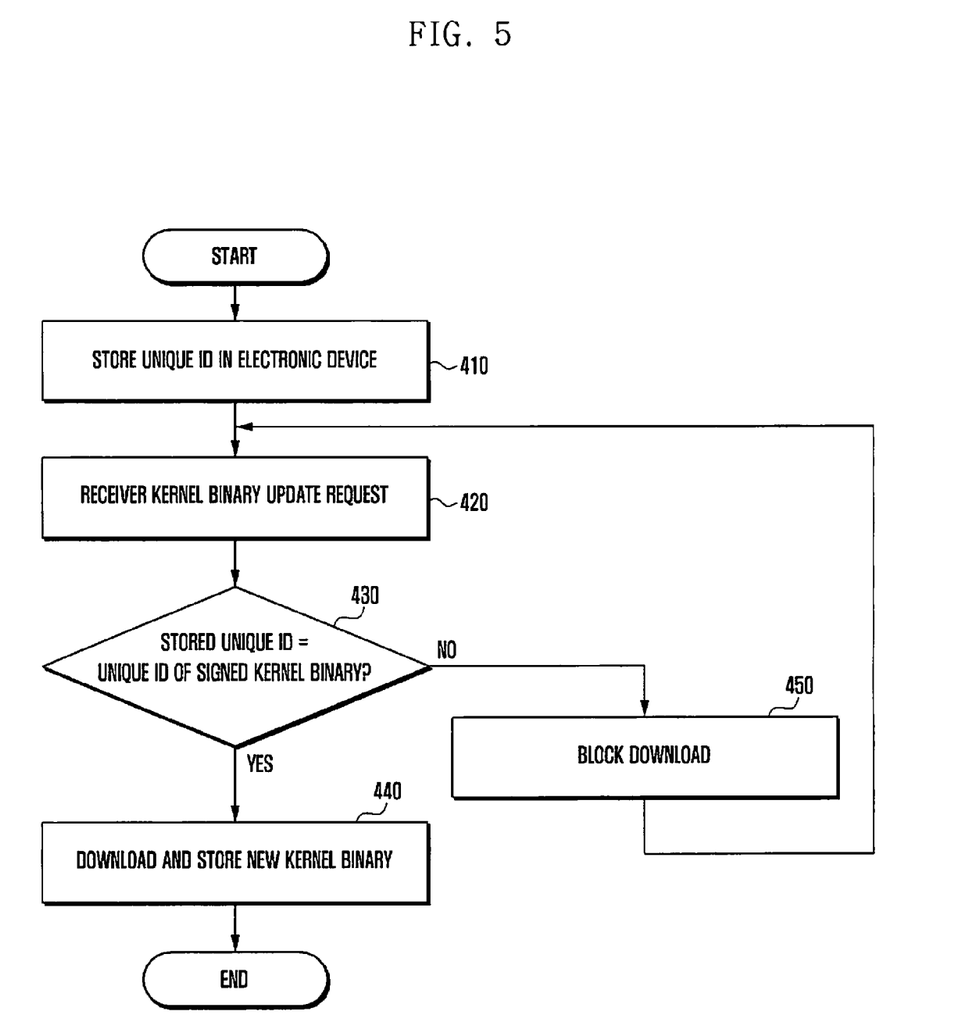
FIG. 5 is a flowchart illustrating a kernel binary update method according to an embodiment of the present invention.

FIG. 5 is a flowchart illustrating a kernel binary update method according to an embodiment of the present invention. In the following description, it is assumed that at least one binary, with the exception of the boot loader, is the kernel binary and other binaries (save for the kernel binary) may be applied if necessary.

In the kernel binary update procedure of FIG. 5 according to an embodiment of the present invention, the electronic device 100 stores at least one unique ID at step 410. The unique ID is stored in the electronic device 100 for use in authentication of a new kernel binary before the download of the new kernel binary and compared with the unique ID signed to the new kernel binary to determine whether they match. At least one unique ID corresponding to candidate B2B clients and ordinary users may be stored in the first memory 120.

In an embodiment of the present invention, it may be assumed that the unique ID is the ID of a specific business user (B2B) for discriminating the specific business user (B2B) from the ordinary user (B2C and the other business user (B2B) having no corresponding unique ID. The unique ID may be stored in the first memory 120.

Next, the electronic device 100 receives a kernel binary update request at step 420. That is, a new kernel binary downlink request for changing the first kernel binary for a new kernel binary may be received. The new kernel binary may be downloaded from an external source of the electronic device 100 through a connection interface. The connection interface may be a USB connection interface, an Ethernet connection interface, or a wireless network connection interface.

At step 430, the electronic device 100 determines whether the unique ID stored in the electronic device 100 at step 410 matches the unique ID of the new kernel binary. That is, the electronic device 100 determines whether the unique ID stored in the first memory 120 is identical with the unique ID included in the new kernel binary.

If the unique ID stored in the electronic device 100 and the unique ID of the new kernel binary match at step 430, the electronic device 100 verifies that the new kernel binary is the unique kernel binary of specific business user (B2B) and downloads and stores the new kernel binary at step 440.

Otherwise if the unique ID stored in the electronic device 100 and the unique ID of the new kernel binary mismatch at step 430 or if the new kernel binary has no unique ID, this means that the new kernel binary is not any kernel binary of the business user (B2B) an thus the electronic device 100 determines authentication failure and blocks download of the new kernel binary at step 450. If the new kernel binary has no unique ID or if the unique ID of the new kernel binary mismatch the unique ID of the first kernel binary, this means that the new kernel binary is not configured for specific business user (B2B).

Figure 6:
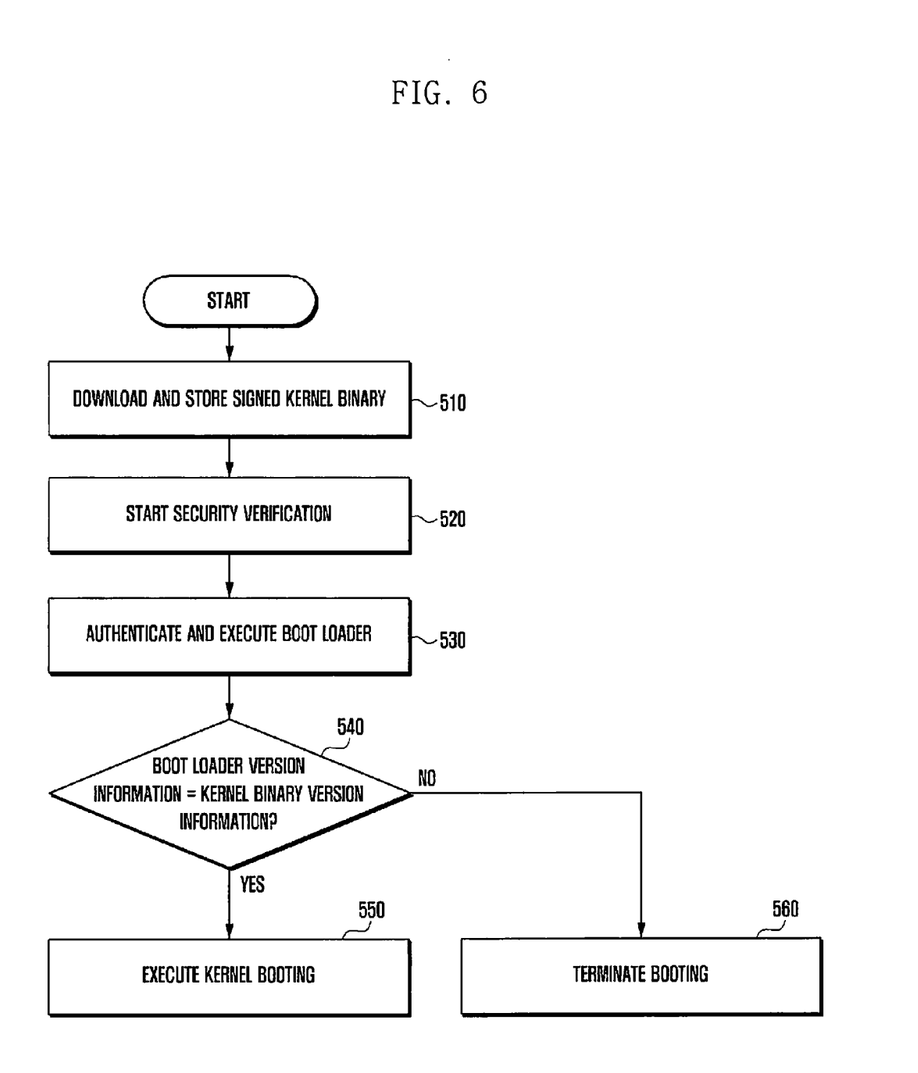
FIG. 6 is a flowchart illustrating the secure booting method according to an embodiment of the present invention.

FIG. 6 is a flowchart illustrating the secure booting method according to an embodiment of the present invention. In the following description, it is assumed that the at least one binary, with the exception of the boot loader, is the kernel binary and other binaries (save for the kernel binary) may be applied if necessary.

First, the processor 114 downloads and stores the kernel binary signed as described above with reference to FIG. 4 in the electronic device 100 at step 510.

Next, the processor 114 starts the security verification at step 520.

Next, the processor 114 loads the boot loader including the boot image on the internal or external volatile memory and starts the security authentication on the loaded boot loader at step 530. The processor 114 determines whether the initial hash value of the initial certification storage region 152 matches the current hash value to verify whether the code and data stored in the initial certificate storage region 152 are forged, replaced, corrupted, or modified. At this time, a plurality of boot loaders can be authenticated and executed sequentially for security verification.

After verifying the basic security with the authentication and execution of the boot loader, if the kernel binary is loaded by the last boot loader, the processor 114 determines whether specific information of the boot loader matches specific information of the kernel binary at step 540.

The specific information may include at least one of version information of the binary and the boot loader, build time, and information paired between the boot loader and the binary.

If the version information of the boot loader and the specific information of the kernel binary match each other, the processor 114 loads the kernel binary on the memory to perform kernel booting at step 550.

Otherwise if the version information of the boot loader and the specific information of the kernel binary mismatch, the processor 114 stops the kernel booting and ends the booting procedure of the electronic device 100 at step 560.

As described above, the secure download and security function execution method and apparatus of the present invention determines whether specific information of the signed kernel binary and specific information of the boot loader match in the booting process and continues the kernel booting only when the specific informations match, thereby avoiding malfunctioning probability of the electronic device 100.

In the storage medium (recoding medium) storing the commands according to an embodiment of the present invention, the commands are configured for at least one processor to perform at least one operation in executing the commands and may include the at least one operation.

Also, the secure download and security function execution method and apparatus of the present invention stores the unique IDs of the candidate purchaser and users in the electronic device 100 and compares the unique ID stored according to the trust root change request or kernel binary update request with the unique ID of the new kernel binary intended to be downloaded for authentication, thereby executing secure download in the trust root change process.

The kernel binary download may be performed at the product manufacturing stage or a time point after the product has been supplied and thus the unique certification may be selected and changed according to the user's necessity.

Also, the secure download and security function execution method and apparatus of the present invention loads the signed kernel binary, in the booting process of the electronic device 100, and compares the version of the boot loader and the version of the kernel binary to perform the booting process only when the versions match, thereby executing the secure booting even in the kernel booting process.

Also, the secure download and security function execution method and apparatus of the present invention is capable of performing a function included in the binary such as security download function with authentication of the signature information of a configured specific user, resulting in avoidance of information leakage.

Also, the secure download and security function execution method and apparatus of the present invention is capable of determining a match between specific information of the signed binary and specific information of a boot loader in the booting process and executing, only when the information matches, the function included in the binary, resulting in avoidance of malfunctioning probability of the electronic device 100.

What is claimed is:

1. A method of executing secure download of a kernel binary for an electronic device, the method comprising the steps of:
   storing a unique identifier (ID) of the kernel binary in the electronic device, wherein the stored unique ID of the kernel binary comprises user type information of the kernel binary and user information of the kernel binary;
   receiving a download request for a new kernel binary;
   authenticating the new kernel binary by matching the stored unique ID of the kernel binary and a unique ID signed to the new kernel binary; and
   if the new kernel binary is authenticated successfully, downloading the new kernel binary.

2. The method of claim 1, wherein storing the unique ID of the kernel binary in the electronic device comprises storing the user information of the kernel binary corresponding to at least one of a business user, a personal user, and a manufacturer.

3. The method of claim 1, wherein receiving the download request for the new kernel binary comprises receiving one of a request for switching a trust root of the electronic device manufactured to operate in Business-to-Customer (B2C) mode to Business-to-Business (B2B) mode.

4. The method of claim 1, wherein downloading the new kernel binary comprises blocking the downloading of the new kernel binary if the new kernel binary is authenticated unsuccessfully.

5. The method of claim 1, wherein downloading the new kernel binary comprises flashing the new kernel binary from a flashing tool connected outside of the electronic device to a memory of the electronic device.

6. The method of claim 1, wherein downloading the new kernel binary comprises downloading the new kernel binary from an external device of the electronic device through at least one of a Universal Serial Bus (USB) connection interface, an Ethernet connection interface, and a wireless network connection interface.

7. A method for executing a kernel binary function included in a kernel binary, the method comprising the steps of:
   storing a unique identifier (ID) of the kernel binary and information of at least one boot loader in an electronic device, wherein the stored unique ID of the kernel binary comprises user type information of the kernel binary and user information of the kernel binary;
   sequentially authenticating and executing the at least one boot loader stored in a memory of the electronic device;
   authenticating the kernel binary by matching information stored in the at least one boot loader and information of the kernel binary, wherein the information comprises at least one of version information and build time information; and
   executing, if the kernel binary is authenticated successfully, the kernel binary function included in the kernel binary.

8. The method of claim 7, wherein executing the kernel binary function included in the kernel binary comprises:
   if the kernel binary is authenticated unsuccessfully, performing functions including one of stopping the kernel binary function included in the kernel binary and terminating the kernel binary function included in the kernel binary.

9. The method of claim 7, wherein the information further comprises information paired between the at least one boot loader and the kernel binary.

10. A method for executing a kernel binary function included in a new kernel binary of an electronic device, the method comprising the steps of:
    storing a unique identifier (ID) of a kernel binary and information of at least one boot loader in the electronic device, wherein the stored unique ID of the kernel binary comprises user type information of the kernel binary and user information of the kernel binary;
    authenticating, when a download request for a new kernel binary is received, the new kernel binary by matching the stored unique ID of the kernel binary and a unique ID signed to the new kernel binary;
    downloading and storing, if the new kernel binary is authenticated successfully, the new kernel binary;
    sequentially authenticating and executing the at least one boot loader stored in the electronic device;
    authenticating the new kernel binary by matching the information of the at least one boot loader and information of the stored new kernel binary, wherein the information comprises at least one of version information and build time information; and
    executing, if the new kernel binary is authenticated successfully, the kernel binary function included in the new kernel binary.

11. A secure kernel binary download and kernel binary function execution apparatus, comprising:
    a kernel binary storage unit configured to store a kernel binary loaded by execution of a boot loader and to execute a kernel binary function included in the kernel binary;
    an authentication configuration unit configured to store a unique identifier (ID) of the kernel binary and to authenticate, when a download request for a new kernel binary is received, the new kernel binary by matching the stored unique ID of the kernel binary and a unique ID signed to the new kernel binary, wherein the stored unique ID of the kernel binary comprises user type information of the kernel binary and user information of the kernel binary;
    a boot loader information storage unit configured to store information of the boot loader paired with the kernel binary; and
    a processor configured to download, if the new kernel binary is authenticated successfully, the new kernel binary and to execute, if the new kernel binary is authenticated successfully and after the downloading of the new kernel binary, a kernel binary function included in the new kernel binary.

12. The secure kernel binary download and kernel binary function execution apparatus of claim 11, wherein the user information of the kernel binary corresponds to at least one of a business user, a personal user, and a manufacturer.

13. The secure kernel binary download and kernel binary function execution apparatus of claim 11, wherein the processor is further configured to receive one of a request for switching a trust root of the secure kernel binary download and kernel binary function execution apparatus manufactured to operate in Business-to-Customer (B2C) mode to Business-to-Business (B2B) mode.

14. The secure kernel binary download and kernel binary function execution apparatus of claim 11, wherein the processor is further configured to flash the new kernel binary from a flashing tool connected outside of the secure kernel binary download and kernel binary function execution apparatus to a memory of the secure kernel binary download and kernel binary function execution apparatus.

15. The secure kernel binary download and kernel binary function execution apparatus of claim 11, wherein the processor is further configured to download the new kernel binary from an external device of the secure kernel binary download and kernel binary function execution apparatus through at least one of a Universal Serial Bus (USB) connection interface, an Ethernet connection interface, and a wireless network connection interface.

* * * * *